United States Patent
Homma

[19]

[11] Patent Number: 5,526,917
[45] Date of Patent: Jun. 18, 1996

[54] PART FEEDING APPARATUS CAPABLE OF STABLE FEEDBACK CONTROL OF FEEDING AMOUNT OF PARTS

[75] Inventor: Yasuaki Homma, Tokyo, Japan

[73] Assignee: NEC Corporation, Tokyo, Japan

[21] Appl. No.: 261,218

[22] Filed: Jun. 15, 1994

[30] Foreign Application Priority Data

Jun. 15, 1993 [JP] Japan .................................... 5-168607

[51] Int. Cl.⁶ .................................................. B65G 47/26
[52] U.S. Cl. .......................... 198/444; 198/573; 198/757; 198/958
[58] Field of Search ..................... 198/444, 751, 198/572, 573, 575, 757, 958, 443

[56] References Cited

U.S. PATENT DOCUMENTS

| | | | |
|---|---|---|---|
| 3,547,251 | 12/1970 | Memoe ...................................... | 198/40 |
| 3,618,819 | 11/1971 | Blackburn ................................. | 221/2 |
| 3,626,307 | 12/1971 | Koyama .................................... | 328/133 |
| 3,944,051 | 3/1976 | Weaver ..................................... | 198/40 |
| 4,382,527 | 5/1983 | Lerner ...................................... | 222/56 |
| 4,394,896 | 7/1983 | McComas et al. ...................... | 198/341 |
| 4,462,508 | 7/1984 | Grafius .................................... | 221/201 |
| 4,865,179 | 9/1989 | Carter et al. ............................. | 198/347 |
| 5,042,643 | 8/1991 | Akama .................................... | 198/753 |
| 5,372,237 | 12/1994 | Yagi ........................................ | 198/444 |

FOREIGN PATENT DOCUMENTS

| | | | |
|---|---|---|---|
| 0316048 | 5/1989 | European Pat. Off. . | |
| 3045824 | 8/1982 | Germany . | |
| 2-64513 | 5/1990 | Japan . | |
| 2-231305 | 9/1990 | Japan . | |
| 1111628 | 5/1968 | United Kingdom ................... | 198/958 |

*Primary Examiner*—William E. Terrell
*Assistant Examiner*—T. Kelly
*Attorney, Agent, or Firm*—Young & Thompson

[57] ABSTRACT

In a part feeding apparatus including a feeder bowl for discharging and feeding parts to an assembly apparatus and a hopper for discharging and feeding parts to the feeder bowl, a counter for counting parts discharged from the hopper and a counter for counting parts discharged from the feeder bowl are provided. The hopper is driven, so that a difference between values of the two counters is brought close to a definite value.

9 Claims, 8 Drawing Sheets

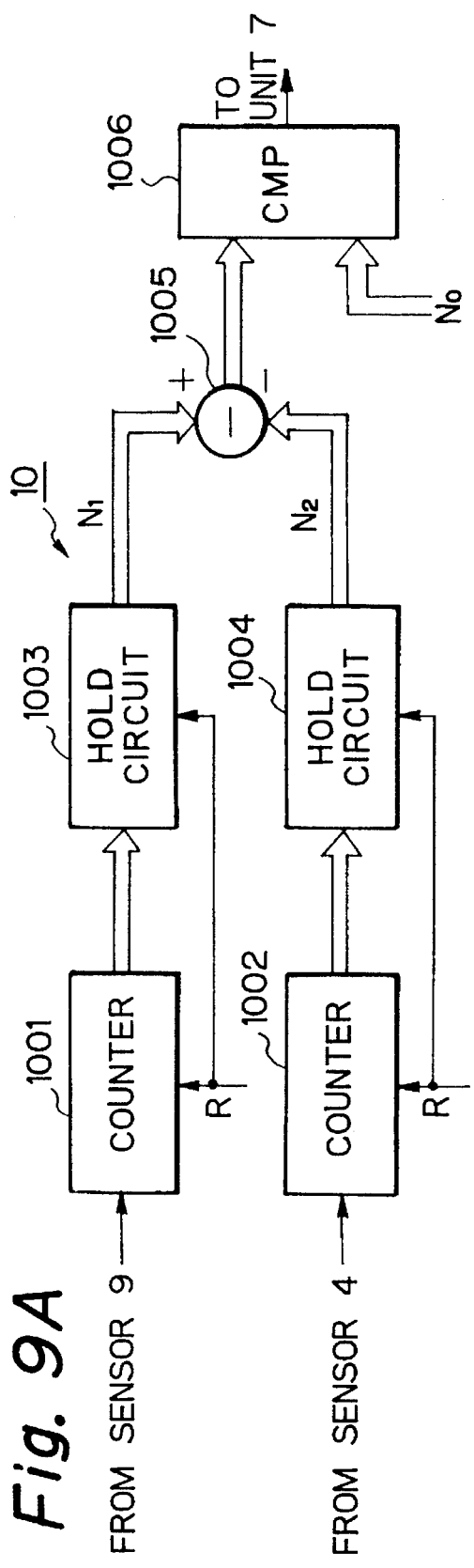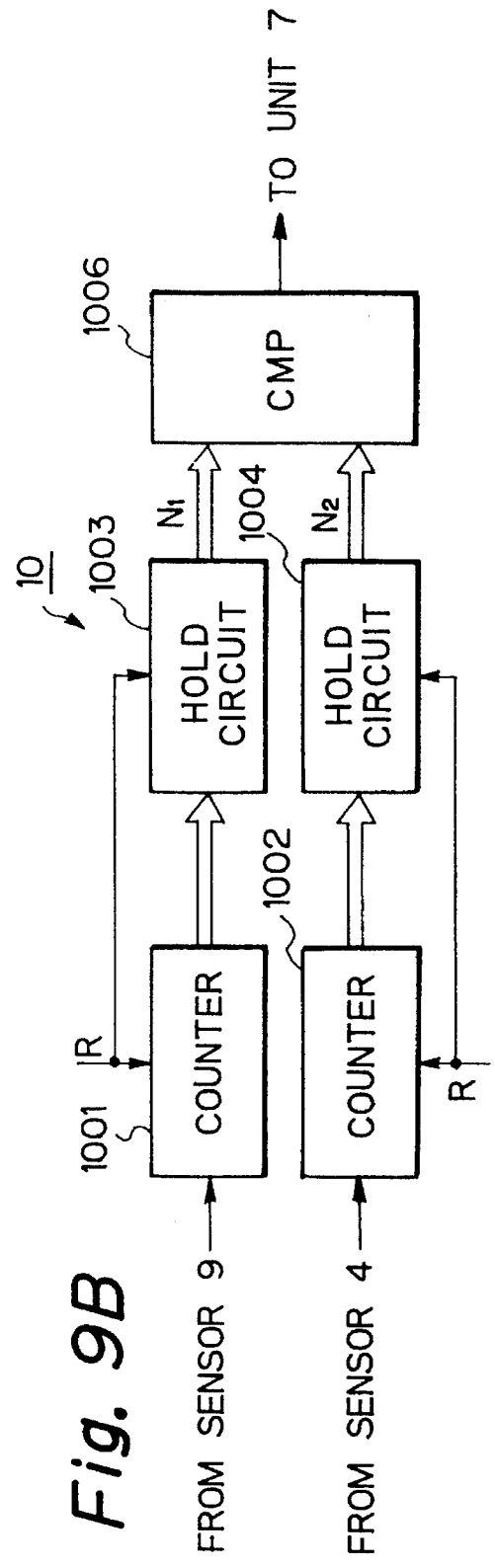

PART FEEDING APPARATUS CAPABLE OF STABLE FEEDBACK CONTROL OF FEEDING AMOUNT OF PARTS

BACKGROUND OF THE INVENTION

1. Field of the Invention

The present invention relates to a part feeding apparatus which can perform a stable feedback control upon a feeding amount of parts such as semiconductor elements.

2. Description of the Related Art

For example, in a semiconductor element assembly apparatus, a part feeding apparatus for feeding parts which are, in this case, semiconductor elements has been combined therewith. In such a part feeding apparatus, it is important to stabilize the amount of parts fed to the assembly apparatus so that it is brought close to a definite value, to thereby suppress fluctuation of a rate of operation of the assembly apparatus.

A first prior art part feeding apparatus is constructed by a feeder bowl for discharging and feeding parts to the assembly apparatus, a feeder bowl driving unit, i.e., an electromagnetic oscillation applying unit, a sensor for detecting parts discharged from the feeder bowl, and a counter for counting the number of parts discharged from the feeder bowl. In this case, an oscillation amplitude of the electromagnetic oscillation applying unit is changed in accordance with a difference between the number of parts discharged from the feeder bowl per unit time and a definite value, so that the number of parts discharged from the feeder bowl is brought close to the definite value (see Japanese Unexamined Patent Publication (Kokai) No. Hei 2-231305). In this first prior art part feeding apparatus, however, since the oscillation amplitude of the electromagnetic oscillation applying unit is changed, this oscillation amplitude may be deviated from an optimum value, thus inviting fluctuation of the number of parts discharged from the feeder bowl. This will be explained later in detail.

A second prior art part feeding apparatus is constructed by a feeder bowl for discharging and feeding parts to the assembly apparatus, a feeder bowl driving unit, i.e., an electromagnetic oscillation applying unit, a sensor disposed within the feeder bowl, a hopper for discharging and feeding parts to the feeder bowl, and a hopper driving unit, i.e., an electromagnetic oscillation applying unit. In this case, the sensor detects whether or not the number of parts within the feeder bowl is smaller than a definite value. As a result, when the number of parts within the feeder bowl is smaller than the definite value, the hopper driving unit is turned ON to discharge and feed parts to the feeder bowl. Contrary to this, when the number of parts within the feeder bowl is not smaller than the definite value, the hopper driving unit is turned OFF to stop discharging and feeding parts to the feeder bowl. Thus, the amount of parts within the feeder bowl is brought close to the definite value. In this second prior art part feeding apparatus, however, since the sensor detects a top of parts within the feeder bowl which does not always correspond to the amount of parts within the feeder bowl, the amount of parts within the feeder bowl is not definite, and accordingly, the amount of feeding parts is not definite. This will be explained later in detail.

A third prior art part feeding apparatus includes a mechanical switch instead of the sensor of the second prior art part feeding apparatus. That is, the mechanical switch detects whether or not the weight of parts within the feeder bowl is less than a definite value. As a result, when the weight of parts within the feeder bowl is smaller than the definite value, the hopper driving unit is turned ON to discharge and feed parts to the feeder bowl. Contrary to this, when the weight of parts within the feeder bowl is not smaller than the definite value, the hopper driving unit is turned OFF to stop discharging and feeding of parts to the feeder bowl. Thus, the weight of parts within the feeder bowl is brought close to the definite value (see Japanese Unexamined Utility Model Publication (Kokai) No. Hei 2-64513). In this third prior art part feeding apparatus, however, when the weight per one part is changed, i.e., the kind of parts is changed, it is necessary to adjust the mechanical switch. This will be explained later in detail.

SUMMARY OF THE INVENTION

It is, therefore, an object of the present invention to provide a part feeding apparatus which can obtain a stable feeding amount of parts without adjustment of a mechanism.

According to the present invention, in a part feeding apparatus including a feeder bowl for discharging and feeding parts to an assembly apparatus and a hopper for discharging and feeding parts to the feeder bowl, a counter for counting parts discharged from the hopper and a counter for counting parts discharged from the feeder bowl are provided. The hopper is driven in accordance with a difference between values of the two counters so that it is brought close to a definite value.

BRIEF DESCRIPTION OF THE DRAWINGS

The present invention will be more clearly understood from the description as set forth below, as compared with the prior art, with reference to the accompanying drawings, wherein:

FIGS. 9A and 9B are block circuit diagrams of the control circuit of FIG. 6.

DESCRIPTION OF THE PREFERRED EMBODIMENT

Before the description of the preferred embodiment, prior art part feeding apparatuses will be explained with reference to FIGS. 1 through 5.

Figure 1:
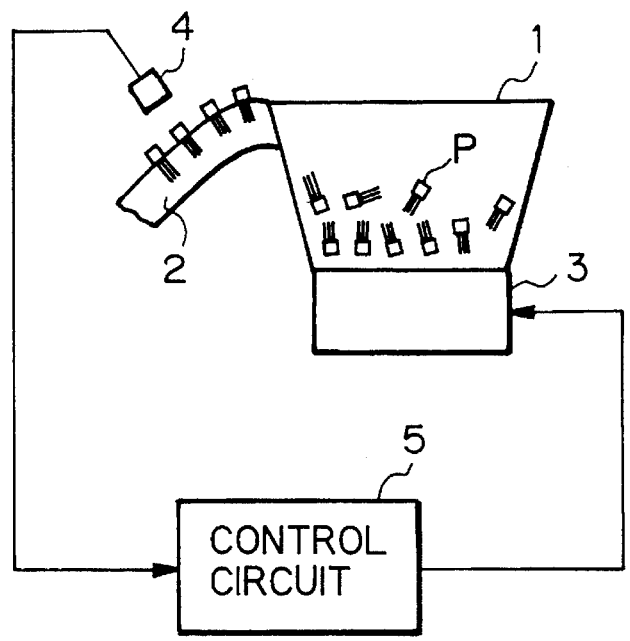
FIG. 1 is a diagram illustrating a first prior art part feeding apparatus.

In FIG. 1, which illustrates a first prior art part feeding apparatus, reference numeral 1 designates a feeder bowl for discharging and feeding parts P via a shoot 2 to an assembly apparatus (not shown). When the feeder bowl 1 is oscillated electromagnetically by a feeder bowl driving unit 3, parts P are discharged from the feeder bowl 1. In this case, the parts P passing through the shoot 2 are detected by a reflection-type or transmission-type sensor 4 provided at the shoot 2, and a sense signal of the sensor 4 is supplied to a control circuit 5. The control circuit 5 includes a counter for counting the sense signals from the sensor 4, i.e., the number of parts P passing through the shoot 2 per unit time. The oscillation amplitude of the feeder bowl driving unit 3 is changed in accordance with a difference between the number of parts P passing through the shoot 2 per unit time and a definite value. As a result, the number of parts P passing through the shoot 2, i.e., the number of parts P discharged from the feeder bowl 1 is brought close to the definite value (see Japanese Unexamined Patent Publication (Kokai) No. Hei 2-231305).

Figure 2A:
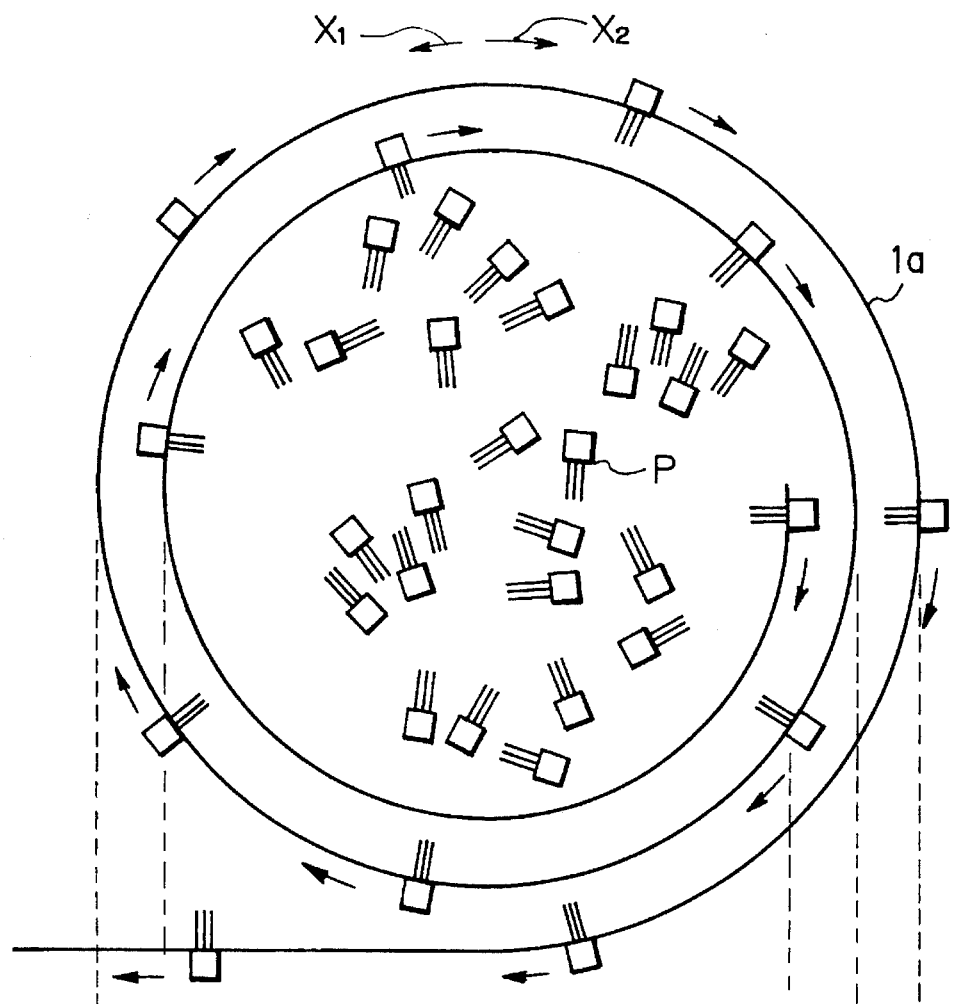
FIG. 2A is a plan view illustrating the track of the feeder bowl of FIG. 1.
Figure 2B:
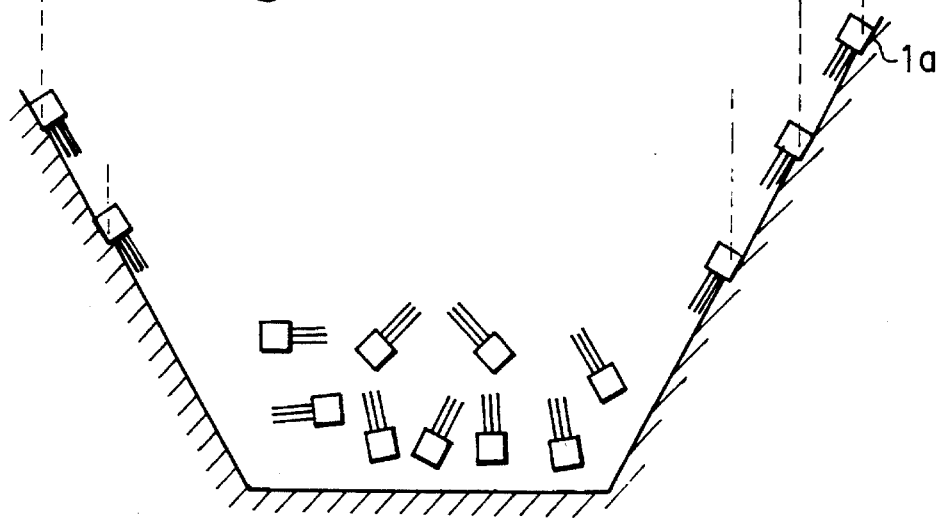
FIG. 2B is a cross-sectional view of the feeder bowl of FIG. 1.

As illustrated in FIGS. 2A and 2B, which illustrate inner constitutional views of the feeder bowl 1 of FIG. 1, a spiral track 1a is provided on a side wall within the feeder bowl 1. When the feeder bowl 1 is oscillated by the feeder bowl driving unit 3, parts P within the feeder bowl 1 gradually climb up along the track 1a to the shoot 2. In more detail, the feeder bowl driving unit 3 is formed by a coil for oscillating the feeder bowl 1 in an axial direction, springs for sustaining the feeder bowl 1 in a radial direction, and the like. As a result, when the feeder bowl driving unit 3 is turned ON, i.e., an alternating current is supplied to the coil thereof, the feed bowl 1 is oscillated along a radial direction as indicated by arrows $X_1$ and $X_2$ due to a resultant force of an electromagnetic force and a spring force. In this case, the force indicated by the arrow $X_1$ is stronger than the force indicated by the arrow $X_2$, and as a result, parts P climb up along the track 1a due to a frictional force generated between the parts P and the track 1a.

Figure 3:
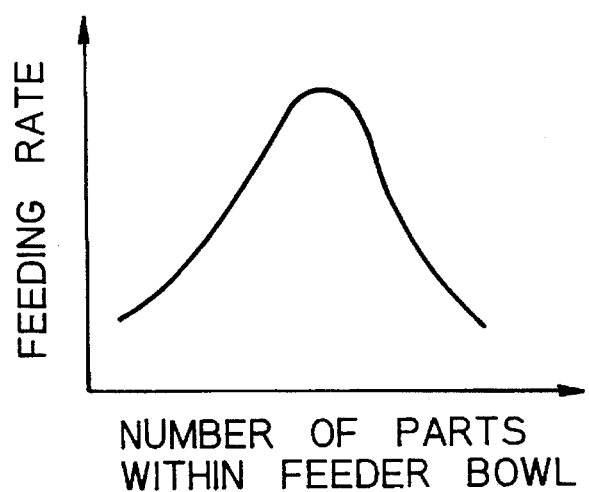
FIG. 3 is a diagram showing a relationship between the number of parts within the feeder bowl and the rate of parts discharged from feeder bowl of FIG. 1.

However, when the oscillation amplitude of the feeder bowl driving unit 3 is definite, a relationship between the number of parts within the feeder bowl 1 and a feeding rate of parts is as shown in FIG. 3. This relationship is changed in accordance with the oscillation amplitude of the feed bowl driving unit 3. In other words, there is an optimum oscillation amplitude for each number of parts within the feeder bowl 1. Therefore, when the oscillation amplitude of the feeder bowl driving unit 3 is changed in the first prior art part feeding apparatus of FIG. 1, the oscillation amplitude may be deviated from the optimum oscillation amplitude. At worst, parts P may move off the track 1a, thus inviting fluctuation of the number of parts discharged from the feeder bowl 1.

Figure 4:
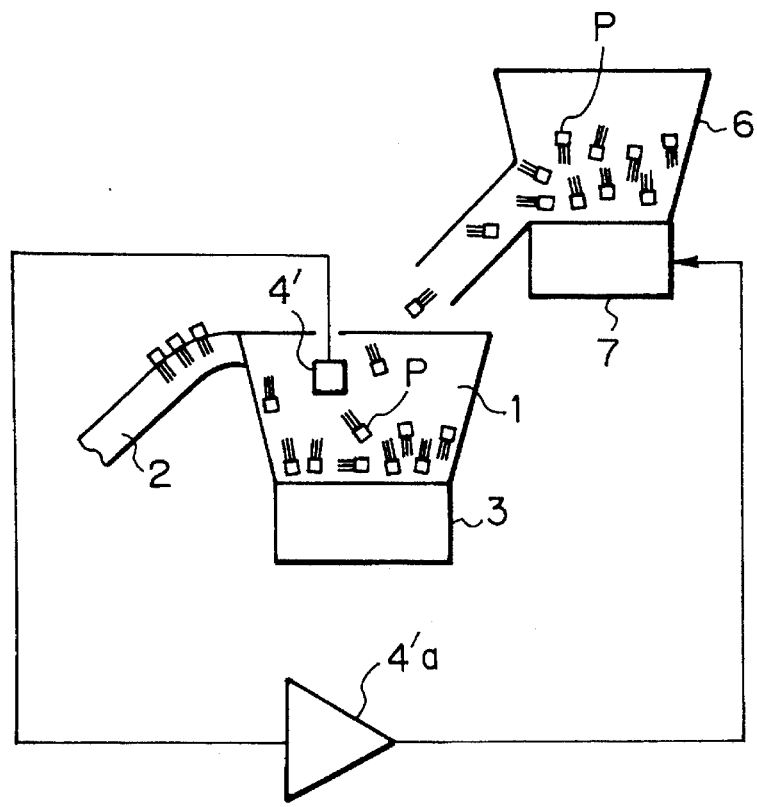
FIG. 4 is a diagram illustrating a second prior art part feeding apparatus.

In FIG. 4, which illustrates a second prior art part feeding apparatus, a hopper 6 for discharging and feeding parts to the feeder bowl 1 and a hopper driving unit (electromagnetic oscillation applying unit) 7 for driving the hopper 6 are added to the elements of FIG. 1. Also, a proximity sensor 4' for sensing a remaining amount of parts and an amplifier 4'a for amplifying an ON/OFF signal of the proximity sensor 4' are provided instead of the sensor 4 and the control circuit 5. In this case, the proximity sensor 4' detects whether or not the number of parts within the feeder bowl 1 is smaller than a definite value. As a result, when the number of parts within the feeder bowl 1 is smaller than the definite value, the hopper driving unit 7 is turned ON to discharge and feed parts P to the feeder bowl 1. Contrary to this, when the number of parts P within the feeder bowl 1 is not smaller than the definite value, the hopper driving unit 3 is turned OFF to stop discharging and feeding parts P to the feeder bowl 1. Thus, the amount of parts within the feeder bowl is brought close to the definite value. In this second prior art part feeding apparatus of FIG. 4, however, since the proximity sensor 4' detects a top of parts within the feeder bowl 1 which does not always correspond to the amount of parts within the feeder bowl 1, the amount of parts within the feeder bowl 1 is not definite, and accordingly, the amount of feeding parts P is not definite and is unstable.

Figure 5:
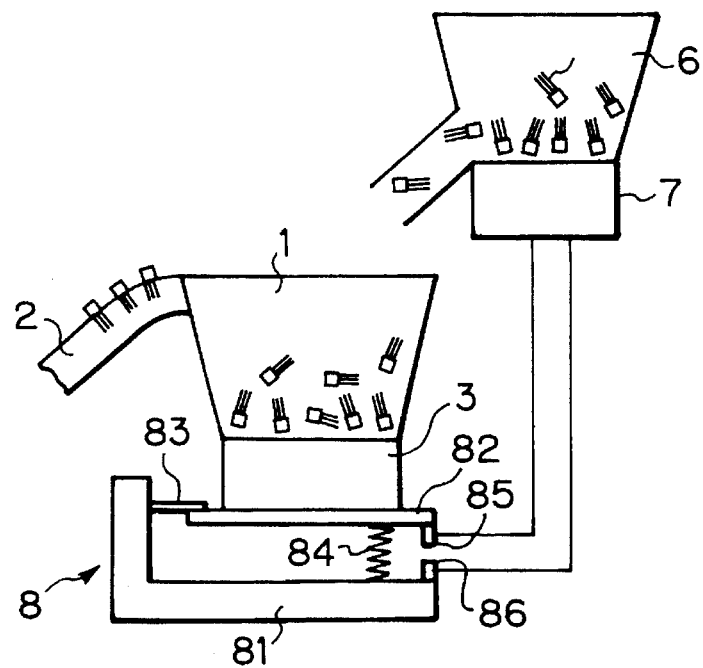
FIG. 5 is a diagram illustrating a third prior art part feeding apparatus.

In FIG. 5, which illustrates a third prior art part feeding apparatus, a mechanical switch 8 is provided instead of the proximity sensor 4' and the amplifier 4'a of FIG. 4. That is, the mechanical switch 8 is constructed by a base 81, a base 82 supported by a plate spring 83 and a compression spring 84 to the base 81, and contacts 85 and 86 fixed at ends of the bases 81 and 82. As a result, when the weight of parts P within the feeder bowl 1 is smaller than the definite value, the contact 85 is in contact with the contact 86, so that the hopper driving unit 7 is turned ON to discharge and feed parts P to the feeder bowl 1. Contrary to this, when the weight of parts P within the feeder bowl 1 is not smaller than the definite value, the hopper driving unit 7 is turned OFF to stop discharging and feeding parts P to the feeder bowl. Thus, the weight of parts within the feeder bowl 1 is brought close to the definite value (see Japanese Unexamined Utility Model Publication (Kokai) No. Hei 2-64513). In this third prior art part feeding apparatus, however, when the weight per one part is changed, i.e., the kind of parts is changed, it is necessary to adjust the mechanical switch 8, i.e., change the plate spring 83 and the compression spring 84.

Figure 6:
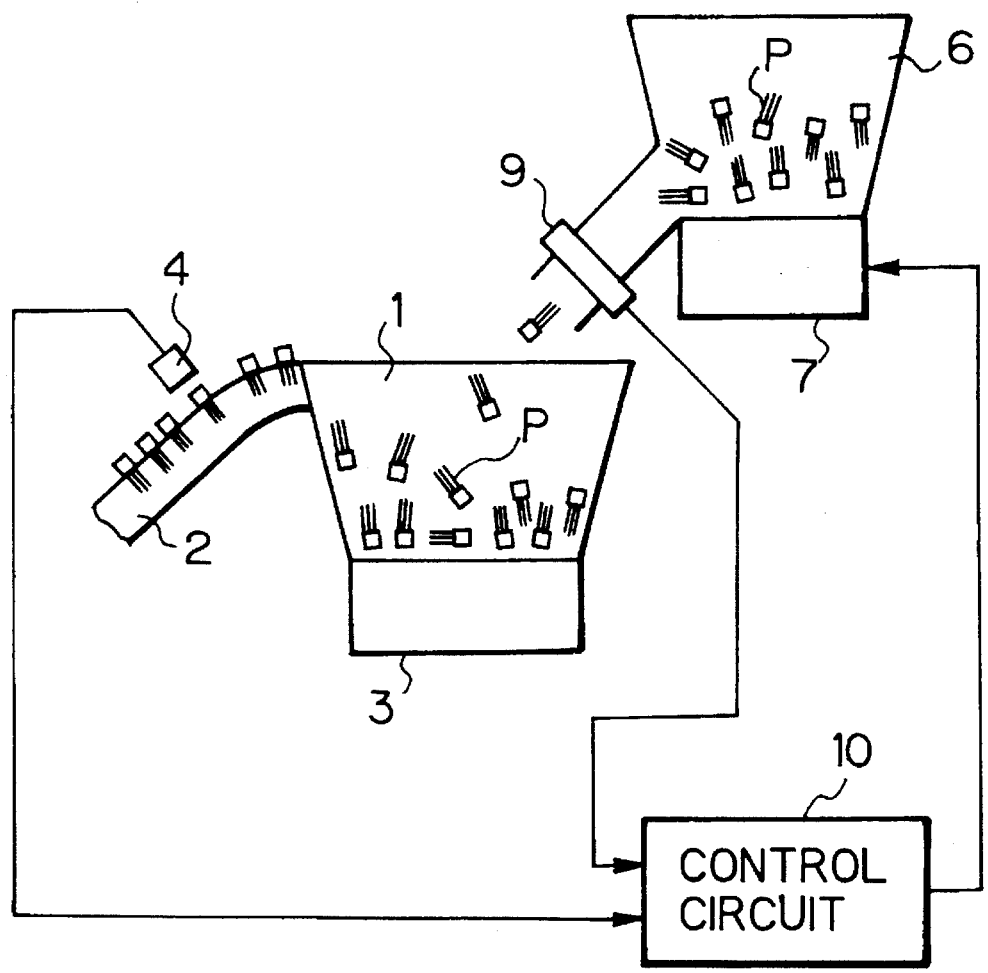
FIG. 6 is a diagram illustrating an embodiment of the part feeding apparatus according to the present invention.

In FIG. 6, which illustrates an embodiment of the present invention, the sensor 4 of FIG. 1 and a sensor 9, and a control circuit 10 are provided instead of the proximity sensor 4' and the amplifier 4'a of FIG. 4. The sensor 9 is located at a lower outlet portion of the hopper 6, and is used for detecting parts P discharged from the hopper 6. The control circuit 10 receives the output signals of the sensors 4 and 9 to turn ON and OFF the hopper driving unit 7.

Figure 7:
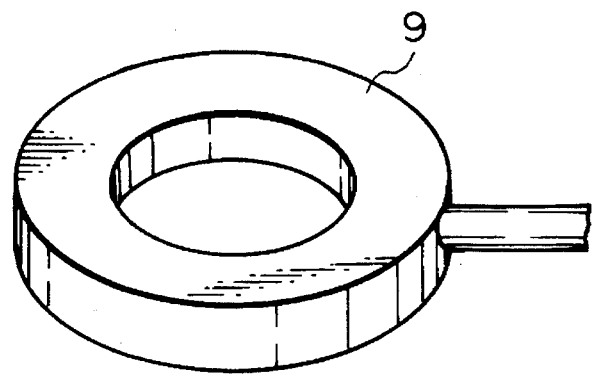
FIG. 7 is a perspective view of the sensor of FIG. 6.
Figure 8:
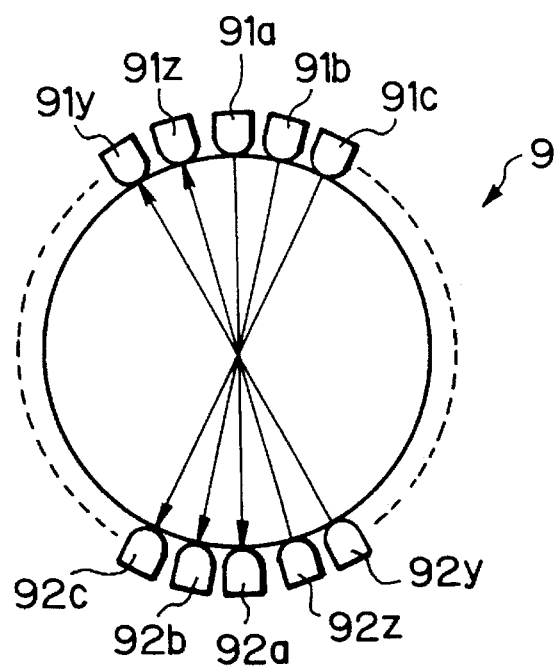
FIG. 8 is an internal constitutional view of the sensor of FIG. 7.

As illustrated in FIG. 7, the sensor 9 has a cylinder-shaped configuration through which parts P discharged from the hopper 6 pass. Also, as illustrated in FIG. 8, the sensor 9 includes a pair of comprised a light emitting element such as a light emitting diode (LED) 91a and a light receiving element such as a photo transistor 92a, a pair comprised of an LED 91b and a photo transistor 92b, . . . , and a pair comprised of an LED 91z and a photo transistor 92z. In this case, the LED 91a, 91b, . . . , 91z oppose the photo transistors 92a, 92b, . . . , 92z, respectively. Thus, existence of any parts can be detected by the sensor 9.

The details of the control circuit 10 will be explained with reference to FIGS. 9A and 9B.

As illustrated in FIG. 9A, a counter 1001 counts pulse signals of the sensor 9, i.e., parts discharged from the hopper 6. Also, a counter 1002 counts pulse signals of the sensor 9, i.e., parts discharged from the feeder bowl 1. The values of the counters 1001 and 1002 are transferred to hold circuits 1003 and 1004, respectively, in response to a reset signal R which is generated at every unit time. In this case, the counters 1001 and 1002 are cleared by the reset signal R. Therefore, the number $N_1$ of parts P discharged from the hopper 6 per unit time is stored in the hold circuit 1003, and the number $N_2$ of parts P discharged from the feeder bowl 1 per unit time is stored in the hold circuit 1004. A difference $(N_1-N_2)$ between the values $N_1$ and $N_2$ of the hold circuits 1003 and 1004 is calculated in a substracter 1005. Then, a comparator 1006 compares the difference ($N_1-N_2$) with a definite value $N_0$ which corresponds to an initial residual amount of parts P within the feeder bowl 1. That is, when $N_1-N_2<N_0$, the comparator 1006 generates a high level signal to turn ON the hopper driving unit 7. Contrary to this, when $N_1-N_2 \geq N_0$, the comparator 1006 generates a low level signal to turn OFF the hopper driving unit 7. Thus, the difference ($N_1-N_2$) is brought close to the definite value $N_0$.

In FIG. 9B, which is a modification of FIG. 9A, the substractor 1005 of FIG. 9A is deleted, and accordingly, the comparator 1005 compares the value $N_1$ of the hold circuit 1003 with the value $N_2$ of the hold circuit 1004. Thus, the number $N_1$ of parts P discharged from the hopper 6 is brought close to the number $N_2$ of parts P discharged from the feeder bowl 1. In this case, the number $N_0$ of parts P corresponding to the initial residual amount of parts P are put manually into the feeder bowl 1 prior to the operation of the part feeding apparatus.

The control circuit 10 can be contructed by a microcomputer including a central processing unit (CPU) and the like. In this case, the CPU of the control circuit 10 operates as illustrated in FIGS. 10A, 10B and 10C.

Figure 10A:
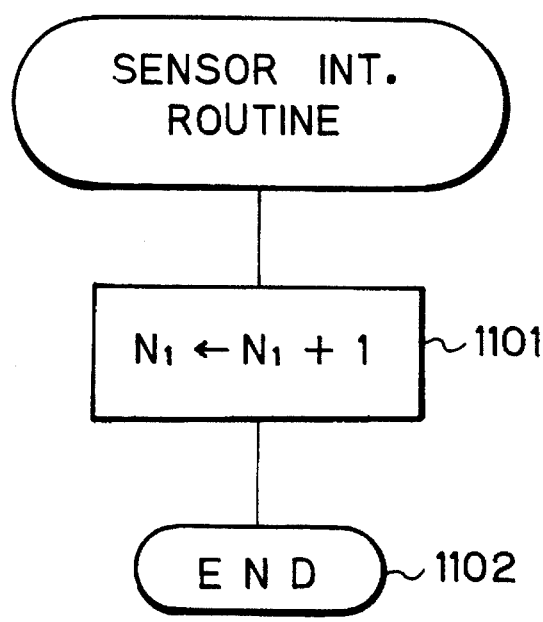
FIGS. 10A, 10B and 10C are flowcharts showing the operation of the control circuit of FIG. 6.

In FIG. 10A, which is an interrupt routine performed at every rise or fall of the signal from the sensor 9, at step 1101, a counter value $N_1$ is counted up by +1, and then, this routine is completed by step 1102.

Figure 10B:
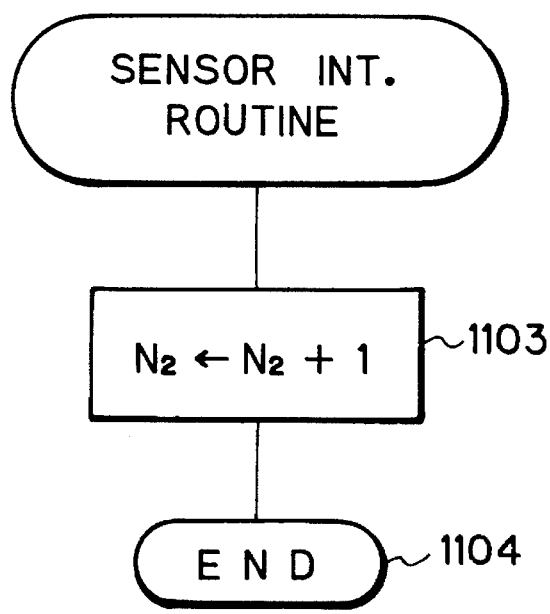

Similarly, in FIG. 10B which is an interrupt routine performed at every rise or fall of the signal from the sensor 4, at step 1103, a counter value $N_2$ is counted up by +1, and then, this routine is completed by step 1104.

Figure 10C:
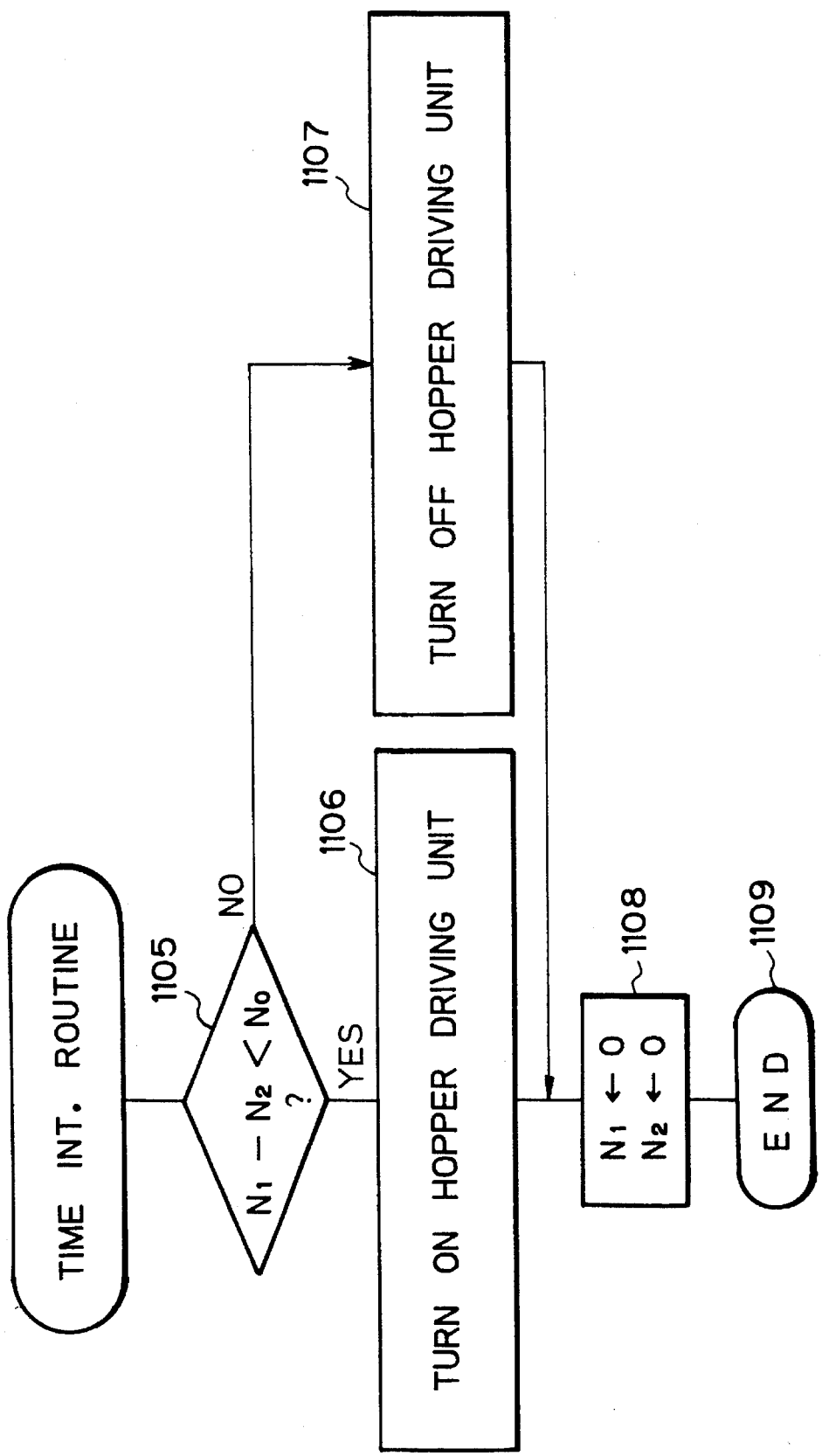

In FIG. 10C, which is an interrupt routine performed at every unit time period, at step 1105, it is determined whether or not $N_1-N_2<N_0$. As a result, when $N_1-N_2<N_0$, the control proceeds to step 1106 which ! turns ON the hopper driving unit 7. Conversely, when $N_1-N_2 \geq N_0$, the control proceeds to step 1107 which turns OFF the hopper driving unit 7. Then, at step 1108, the counter values $N_1$ and $N_2$ are cleared. Thus, this routine is completed by step 1109.

Therefore, the difference between the counter values $N_1$ and $N_2$ is brought close to the definite value No by the routines of FIGS. 10A, 10B and 10C, in the same way as in the control circuit 10 of FIG. 9A. Note that, if the value $N_0$ at step 1105 of FIG. 10C is 0, the routines of FIGS. 10A, 10B and 10C correspond to the operation of the control circuit 10 of FIG. 9B.

Also, when the part feeding apparatus of FIG. 6 is being operated, the feeder bowl 1 is always driven by an optimum oscillation amplitude of the feeder bowl driving unit 3.

As explained hereinbefore, according to the present invention, a stable feeding amount of parts can be obtained without adjustment of a mechanism.

I claim:

1. A part feeding apparatus for feeding parts to an assembly apparatus, comprising:

a feeder bowl for discharging and feeding parts to said assembly apparatus;

a feeder bowl driving unit for driving said feeder bowl;

a hopper for discharging and feeding parts to said feeder bowl;

a hopper driving unit for driving said hopper;

a first counting means for counting parts discharged from said hopper;

a second counting means for counting parts discharged from said feeder bowl;

a controlling means for controlling said hopper driving unit so that a difference between values of said first and second counting means is brought close to a definite value, a cylinder connected to a lower outlet of said hopper, parts within said hopper being discharged and fed via said cylinder to said feeder bowl, when said hopper driving unit is turned on; and a first ring-shaped sensor, provided at said cylinder, for detecting parts passing through said cylinder, said first sensor being connected to said first counting means.

2. An apparatus as set forth in claim 1, wherein said controlling means comprises:

means for calculating the difference between the values of said first and second counting means;

means for comparing the difference between the values of said first and second counting means with the definite value;

means for turning ON said hopper driving unit when the difference between the values of said first and second counting means is smaller than the definite value; and means for turning OFF said hopper driving unit when the difference between the values of said first and second counting means is not smaller than the definite value.

3. An apparatus as set forth in claim 1, wherein said controlling means comprises:

means for comparing the value of said first counting means with that of said second counting means;

means for turning ON said hopper driving unit when the value of said first counting means is smaller than the value of said second counting means; and means for turning OFF said hopper driving unit when the value of said first counting means is not smaller than the value of said second counting means.

4. An apparatus as set forth in claim 1, wherein each of said first and second counting means comprises:

a counter for counting parts, said counter being cleared at regular time intervals; and a holder circuit for holding a value of said counter at each of said regular intervals.

5. An apparatus as set forth in claim 1, wherein each of said first and second counting means carries out a counting operation for a unit of time.

6. An apparatus as set forth in claim 1, wherein said first sensor includes a plurality of pairs of opposing light emitting means and light receiving means arranged in a circle.

7. An apparatus as set forth in claim 1, further comprising:

a shoot connected to an upper outlet of said feeder bowl; and a second sensor, provided at said shoot, for detecting parts passing through said shoot, said second sensor being connected to said second counting means.

8. An apparatus as set forth in claim 7, wherein said feeder bowl includes a spiral track within an inner wall of said feeder bowl, said spiral track leading to said shoot, parts within said feeder bowl being aligned via said spiral track with said shoot, when said feeder bowl driving unit is turned ON.

9. An apparatus as set forth in claim 1, wherein each of said feeder bowl driving unit and said hopper driving unit comprises an electromagnetic oscillation applying unit.

\* \* \* \* \*